United States Patent Office 3,429,688
Patented Feb. 25, 1969

3,429,688
METHOD FOR COMBATING UNDESIRED PLANT GROWTH
Dieter Duerr, Basel, Hans Aebi, Riehen, and Ludwig Ebner, Stein, Aargau, Switzerland, assignors to Ciba Limited, Basel, Switzerland, a Swiss company
No Drawing. Filed May 23, 1963, Ser. No. 282,588
Claims priority, application Switzerland, May 28, 1962, 6,460/62
U.S. Cl. 71—90      3 Claims
Int. Cl. A01n 5/00; C07d 91/46

The present invention provides agents for combating pests, especially weeds and phytopathogenic microorganisms, containing as active principle a compound of the general formula

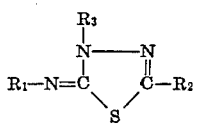

(I)

or of the isomeric formula

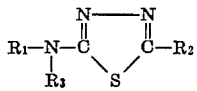

(II)

where $R_1$ is a phenyl radical which may be substituted by a lower alkyl radical or by the group —$CF_3$, or a saturated or unsaturated, preferably lower, aliphatic radical; $R_2$ represents a hydrogen atom or a lower alkyl radical, or a phenyl radical which may be substituted by at least one, preferably lower, alkyl or alkoxy group, at least one halogen atom (preferably a chlorine, bromine or fluorine atom), or by at least one —$NO_2$, —$CF_3$ or

group (in which A and A' each represents a hydrogen atom or a lower alkyl radical); and $R_3$ stands for a hydrogen atom or a preferably lower alkyl radical or for the radical R—CO— (where R is a preferably lower alkyl radical), or a salt or quaternary ammonium compound thereof, and, if desired, at least one of the following additives:

Vehicles, emulsifiers, dispersants, wetting agents, distributing agents, solvents, fertilizers, adhesives and other weed killers or pesticides.

Especially valuable among the afore-mentioned agents are those which contain, as active principle, a compound of the general formula

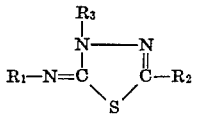

(III)

or of the formula

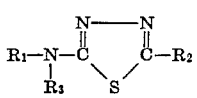

(IV)

where $R_1$ stands for a phenyl, a methyl or an allyl group; $R_2$ stands for a hydrogen atom, or a phenyl radical which may be substituted by a chlorine atom, or a lower alkyl radical, and $R_3$ represents a hydrogen atom or the acetyl radical, or their salts and quaternary ammonium compounds with a quaternating agent, for example, dimethylsulfate.

The compound of the formula

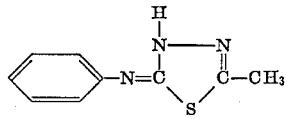

is particularly valuable since, by virtue of its specific selectivity, it can be used with optimum results for combating weeds in cultures of root crops, especially in sugarbeet cultures or onion cultures, without detrimental effect to these crops themselves.

The compounds of the general Formulae I and II can be prepared by known methods, for example in the following manner:

A 4-substituted thiosemicarbazide (A) is acylated in position 1 with a carboxylic acid or a reactive derivative thereof, whereupon the ring is closed, for example with acetyl chloride, with elimination of water, to form the iminothiadiazoline, for example as represented by the following diagram:

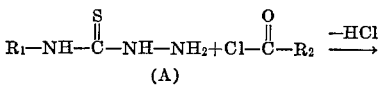

(A)

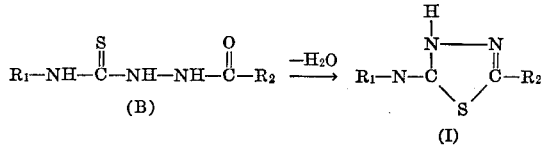

where $R_1$ and $R_2$ have the same meanings as in the above general Formula I.

In many cases, there is no need to isolate the compound B—which is also accessible by other methods, for example by reacting a carboxylic acid hydrazide with a mustard oil—before proceeding to the elimination of water. The compounds of the general Formulae I and II are obtained for example when acetyl chloride is used for the elimination, in the form of their hydrochlorides from which the free bases are liberated by using alkalies.

The compounds set forth above may be present as salts with the usual inorganic or organic acids, for example HCl, HBr, HJ, HF, $H_2SO_4$, $H_3PO_4$, $HPO_3$, $HNO_3$, $HClO_4$, $HSO_3NH_2$, $CH_3COOH$, $CCl_3COOH$, citric acid, lactic acid, formic acid, oxalic acid, glycollic acid, benzoic acid, oleic acid; 2,3,6-trichloro-benzoic acid, dodecyl benzene sulfonic acid, salicylic acid, nicotinic acid; $CH_3$-$CCl_2$-COOH.

As mentioned above, the new agents of the invention may contain, apart from the active principles of the general Formula I or II, various additives. This enables the new active principles to be used in a variety of ways which are referred to below:

The spray liquors intended for direct use contain, for example, petroleum fractions having a high to medium boiling range, more especially above 100° C., for example diesel oil or kerosene, also coal tar oils or oils of vegetable or animal origin, as well as hydrocarbons for example alkylated naphthalenes, tetrahydronaphthalene, if desired with the use of xylene mixtures, cyclohexanols, ketones, also chlorinated hydrocarbons for example tetrachloroethane, trichloroethylene or trichlorobenzenes and tetrachlorobenzenes.

Aqueous forms of application are prepared with emulsion concentrates, pastes or wettable spray powders, with the addition of water. Suitable emulsifiers or dispersants are non-ionic products, for example condensation products of alphatic alcohols, amines or carboxylic acids having a long carbon chain of about 10 to 30 carbon atoms, with ethylene oxide, for example the condensation product from octadecyl alcohol with 25 to 30 molecular proportions of ethylene oxide, or of soyabean fatty acid with 30 mols of ethylene oxide, or of commercial oleylamine with 15 mols of ethylene oxide, or of dodecylmercaptan with 12 mols of ethylene oxide. There may also be used condensation products of ethylene oxide with hydroaromatic polycyclic carboxylic acids or amines. As suitable anionic amulsifiers, there may be mentioned: the sodium salt of dodecyl alcohol sulfuric acid ester, the sodium salt of dedocylbenzenesulfonic acid, the potassium or triethanolamine salt of oleic acid or of abietic acid or of a mixture of these two acids, or the sodium salt of a petroleumsulfonic acid. Suitable cationic dispersants are quaternary ammonium and phosphonium compounds for example cetyl pyridinium chloride or dihydroxyethyl benzyldodecyl ammonium chloride.

The dusting or scattering agents used contain as solid vehicles talcum, kaolin, bentonite, sand, calcium carbonate, calcium phosphate, or coal, cork meal, wood meal or other materials of vegetable origin. As is usual, the various preparations may further contain substances that improve the distribution, adhesion or penetration. As such substances there may be mentioned fatty acids, resins, glue, casein or, for example, alginates. It is also especially advantageous to use the preparations in the form of granulates.

The new preparations may also contain fertilizers, for example superphosphates or urea. Apart from the compounds of the general Formula I or II other herbicides may be additionally used in suitable mixtures for weed killing, for example halogenated phenoxyalkanecarboxylic acids, halogenated benzoic acids or phenylacetic acids or the corresponding nitriles; furthermore halogenated fatty acids or salts, esters or amides thereof; also certain tertiary or quaternary amines having a herbicidal effect, for example dodecylhexamethyleneimine or its salts, or 1:1'-ethylene-dipyridinium bromide. Herbicidally acting derivatives of triazine may likewise be incorporated in the preparations, also certain herbicidal heterocyclic compounds, for example 2-chlorobenzthiazole, 3-amino-1:2:4-triazole, maleic acid hydrazide, 3:5-dimethyltetrahydro-1:3:5-thiodiazine-2-thione, and also simpler herbicides for example pentachlorophenol, dinitrocresol, dinitrobutylphenol or naphthylphthalamic acid.

Weeds that can be combated with the agents of the invention also include undesired culture plants. The agents may be used by the pre-emergence method or by the post-emergence method. Depending on the amount used, the weed killing effect achieved may be selective or total.

The agents of the invention are suitable not only as herbicides but, when used in a concentration that does not give rise to phytotoxic phenomena, they also display an excellent effect on noxious microorganisms, for example fungi, such as *Alternaria solani, Phytophthora infestans, Septoria appii* and other fungi being well known as phytopathogens.

The present invention also provides the new compounds of the above general Formulae I or II, more especially III or IV and preferably of the following formula

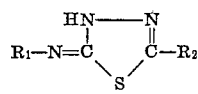

where $R_1$ represents a lower aliphatic radical or a phenyl radical substituted by a lower alkyl radical or by the group —$CF_3$, and $R_2$ stands for a lower alkyl radical or a phenyl radical substituted by one or more chlorine atoms.

The following examples illustrate the invention, the percentages being by weight.

Example 1

(a)

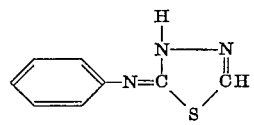

5-phenylimino-1:3:4-thiadiazoline

A mixture of 60 g. of 4-phenylthiosemicarbazide and 200 ml. of formic acid of 98 to 100% strength was refluxed for 5 minutes, then allowed to cool and poured into approximately 1 liter of water. The resulting white precipitate was filtered off and dried under vacuum. Yield: 45 g. Melting point 174–176° C. after recrystallization from aqueous alcohol.

(b) Methylation product of compound (a) with dimethylsulfate.—A mixture of 12 g. of 5-phenylimino-1:3:4-thiadiazoline and 75 ml. of dimethylsulfate was heated for a short time; the reaction solution was cooled to 40° C. and then mixed with ether, while being agitated. The reaction product of the formula

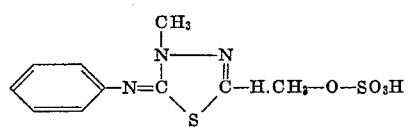

precipitated in the form of faintly yellowish, hygroscopic crystals which were filtered off and could be recrystallized from absolute alcohol admixed with ether. Melting point 127–132° C.

Example 2

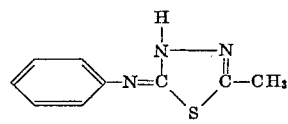

5-phenylimino-2-methyl-1,3,4-thiadiazoline

A suspension of 50 g. of 4-phenylthiosemicarbazide in 200 ml. of benzene was mixed with 75 ml. of acetyl chloride, while being cooled in an ice plus sodium chloride bath. After about 3 hours, the ice bath was removed and the pasty reaction mixture was heated for 30 minutes at 60° C., allowed to cool, poured over about 1 liter of ice water, neutralized with concentrated ammonia, filtered, and the filter residue thoroughly washed with water, then for a short time with acetone and finally with ether, and dried. The yield is substantially quantitative. The product could be recrystallized from alcohol. Melting point 193–194° C.

(b) N-acetyl derivative of compound (a).—125 ml. of acetyl chloride were added drop by drop within 10 minutes to a solution of 50 g. of 4-phenylthiosemicarbazide in 50 ml. of dioxane. The temperature rose rapidly to 90° C. and dropped to about 60° C. towards the end of the addition. The batch was refluxed for 3 hours. The reaction solution was evaporated, and the viscid residue was taken up in 200 ml. of water and alkalinized with sodium hydroxide solution. The batch was filtered, and the filter cake recrystallized from alcohol. Yield: 50 g. of the compound of the formula

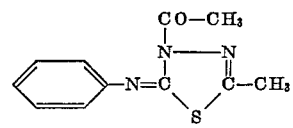

melting at 147–149° C.

(c) The following compounds can likewise be prepared as described in Example 2:

| Active Principle | Melting at— (° C.) |
|---|---|
| 1. 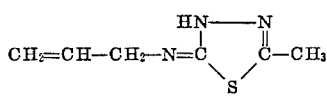 | 110–112 |
| 2. | 188–190 |
| 3. | 218–219 |

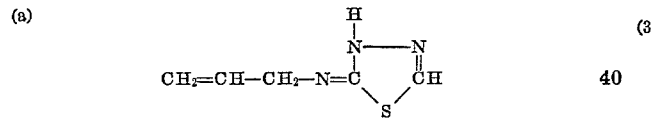

Example 3

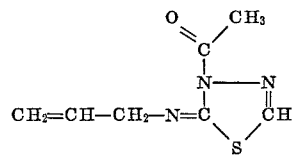

5-allylimino-2-methyl-1:3:4-thiadiazoline. A mixture of 47 g. of 4-allylthiosemicarbazide and 60 ml. of acetonitrile was heated to 50° C. On dropping in 75 ml. of acetyl chloride, the reaction mixture heated up to about 85° C., and a white precipitate formed. The batch was allowed to react for 2 hours longer at 60° C. and then evaporated to dryness under vacuum. The solid residue was recrystallized from absolute alcohol admixed with ether. Yield: 30 g. of once-recrystallized hydrochloride. Melting point 166° C. after previous sintering.

Example 4

(a)

$$CH_2=CH-CH_2-N=C \begin{matrix} H \\ N——N \\ \phantom{N}\phantom{——}\phantom{N} \\ S \end{matrix} CH$$

5-allylimino-1,3,4-thiadiazoline

A mixture of 30 g. of 4-allylthiosemicarbazide and 50 ml. of formic acid of 98–100% strength was heated at the boil for 3 minutes. The reaction solution was evaporated under vacuum, and the residue was dissolved in 35 ml. of acetonitrile; this solution was mixed with 32 ml. of acetyl chloride, heated for 2 to 3 hours at 60° C. and then evaporated under vacuum. The residue was recrystallized from absolute alcohol admixed with ether.

Yield: 19 g. of hydrochloride melting at 125–130° C.

(b) N-acetyl derivative of compound (a):

$$CH_2=CH-CH_2-N=C \begin{matrix} O\!\!\!\!=\!\!\!C\!\!-\!\!CH_3 \\ N——N \\ \phantom{N}\phantom{——}\phantom{N} \\ S \end{matrix} CH$$

55 g. of the hydrochloride described above were stirred with 200 ml. of ether, and approximately half the theoretically required amount of powdered sodium hydroxide was added. The batch was alkalinized by dropping in sodium hydroxide solution of 30% strength, and the precipitated sodium chloride was filtered off. The residue was repeatedly washed with ether, and the filtrates evaporated. The resulting crystalline residue (42 g.; free base of compound 4(a)) was dissolved in 50 ml. of acetic anhydride and heated for 10 minutes at 110° C. On evaporation of the reaction solution, the residue solidified and formed large crystals melting at 54–57° C. A purer product was obtained by distillation under vacuum; it boiled at 140 to 142° C. under 0.1 mm. Hg pressure and melted at 57–59° C.

Example 5

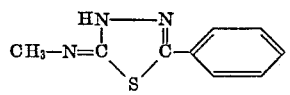

5-methylimino-2-phenyl-1,3,4-thiadiazoline (a) 42.4 g. of 4-methylthiosemicarbazide were stirred in 200 ml. of anhydrous dioxane and 56 ml. of triethylamine, and 56 g. of benzoylchloride were added drop by drop while cooling the batch in an ice plus sodium chloride bath. On completion of the addition, the reaction mixture was heated for 15 minutes on a waterbath, allowed to cool and stirred with approximately 1 liter of water and then filtered. The precipitate was dried, to yield 55 g. of a white powder (crude 4-methyl-1-benzoyl-thiosemicarbazide) which was suspended in 250 ml. of anhydrous benzene, and 45 ml. of acetyl chloride were added drop by drop while cooling the batch in an ice plus sodium chloride bath. After 1 hour, the whole was heated for 15 minutes on a waterbath and then evaporated under vacuum. The residue was dissolved in water, and the resulting aqueous solution was freed from oily constituents, alkalinized with dilute sodium hydroxide solution and filtered. The dried residue consisted of 14 g. of 5-methylimino-2-phenyl-1:3:4-thiadiazoline which melted at 184° C., after recrystallization from dilute alcohol.

(b) The following compounds can likewise be prepared as described in Example 5(a):

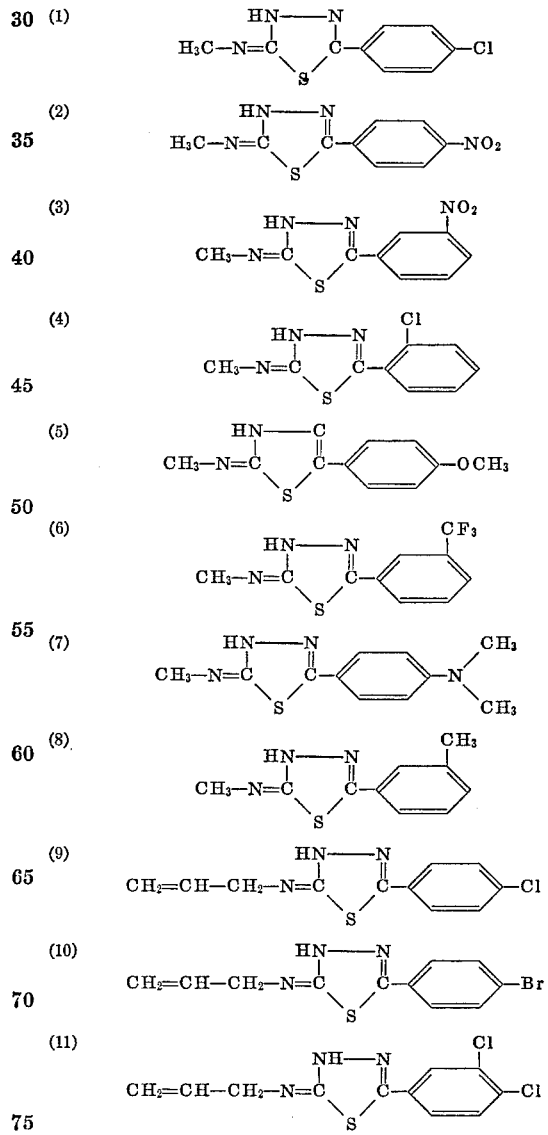

Example 6

20 g. of the compound of the formula

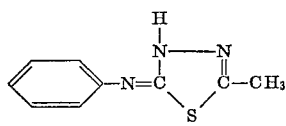

were mixed in a mixer with 25 g. of finely dispersed silica, 3.5 g. of a condensation product from 1 mol of dodecylmercaptan with 12 mols of ethylene oxide, 1.5 g. of a condensation product from 1 mol of para-nonylphenol with 9 mols of ethylene oxide, and 50 g. of kaolin (bolus alba), and the whole was then ground in a rod mill, to yield a fine powder that could be diluted with water in any desired proportion to form a fine dispersion.

Example 7

In a greenhouse, earthenware pots were filled with earth and planted with the following seeds: *Phaseolus vulgaris, Soja max, Medicago sativa, Lactuca sativa, Spinacea oleracea, Daucus carota, Linum usitatissimum, Calendula chrysantha, Beta vulgaris, Dactylis glomerata, Poa trivialis, Alopecurus mijosuroides, Allium cepa.*

(a) The pre-emergence treatment was carried out 2 days after planting with a spray broth prepared as described in Example 6, which contained as active principle the compound described in Example 2(a). The amount used corresponded to 20 kg. of active principle per hectare. Evaluation carried out about 20 days after the treatment revealed that all plants referred to above had died, except *Beta vulgaris, Soja max* and *Phaseolus vulgaris* which had not been substantially inhibited.

(b) The post-emergence treatment of the plants mentioned above was carried out in the manner described under (a) but about 10 days after seeding, when the plants concerned had reached the first foliage leaf stage. The amount used corresponded to 20 kg. of active principle per hectare.

18 days after the treatment all afore-mentioned plants had died, except *Allium cepa* and *Beta vulgaris* which had not been substantially inhibited. *Phaseolus vulgaris* was very strongly inhibited in its growth.

(c) Dishes were filled with agricultural soil material that contained a variety of weed seeds, and sugarbeet seeds were planted. 6 days, and 8 days respectively, after seeding, the dishes were treated with a spray broth according to Example 6, containing the active principle of Example 2(a), corresponding to an amount of 20 kg. of active principle per hectare.

On evaluation 11 days after the treatment, it was found in each case that 95% of the weeds had been killed and that the sugarbeets had not been damaged. In the untreated control tests, the following weeds were identified: Rumex, Crepis, Chenopodium, Taraxacum, Polygonum, Stellaria, Veronica, Sonchus, Senecio, Medicago, Daucus, Raphanus.

Similar herbicibal effects were obtained by using under the conditions described under (a) to (c) above, spray broths that contained as active principle one of the compounds described in Examples 1(a), 2(c) (Nos. 1, 2 and 3), 3, 5(a) and 5(b) (No. 1).

Good selective effects were also obtained by applying the active compounds in an amount of 15–20 kgs./hectare.

Example 8

A spray powder was prepared as described in Example 6, which contained as active principle the compound of the formula

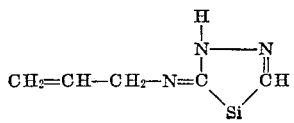

(as the hydrochloride) as described in Example 4(a), instead of the compound described in Example 2. The compound of the above formula could be diluted with water in any desired proportion to form a fine dispersion.

Example 9

Tomato plants were treated with a spray broth, prepared as described in Example 8, containing 0.2% of the active principle described in Example 4(a) in the form of its hydrochloride.

2 days after the treatment, several tomato plants were infected with spores of *Alternaria solani* and others with spores of *Phytophthora infestans* and the plants infected with these fungi were then kept for 2 days in an incubator at a relative atmospheric moisture of 95 to 100% at 22° C. to 26° C. Evaluation 8 days after the infection revealed an unmistakable fungicidal effect of the compound described in Example 4a. No substantial phytotoxic effects on the treated plants could be detected.

Similar fungicidal effects were obtained by using, under the above conditions, spray broths that contained as active principle one of the compounds of Examples 1(a), 2(c) (No. 3) and 5(b) (No. 1).

What is claimed is:

1. The method for combating undesired plant growth, which comprises applying to the area where the plant-combating effect is desired as active principle a herbicidal amount of a member selected from the group consisting of (a) a compound of the formulae

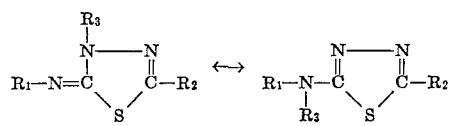

wherein $R_1$ represents a member selected from the group consisting of lower alkyl, lower alkenyl, phenyl, phenyl substituted by lower alkyl and phenyl substituted by the group $-CF_3$, $R_2$ represents a member selected from the group consisting of the hydrogen atom, lower alkyl, phenyl, phenyl substituted at at most 2 places by a member selected from the group consisting of the chlorine atom, the bromine atom, the group $-NO_2$, the group $-CF_3$, lower alkyl, lower alkoxy and the group

wherein A and A' each represents lower alkyl, $R_3$ represents a member selected from the group consisting of the hydrogen atom, lower alkyl and the R—CO—, wherein R represents lower alkyl, and (b) a salt of a compound set forth above in this claim under (a) with an acid selected from the group consisting of HCl, HBr, HJ, HF, $H_2SO_4$, $H_3PO_4$, $HPO_3$, $HNO_3$, $HClO_4$, $HSO_3NH_2$, $CH_3COOH$, $CCl_3COOH$, citric acid, lactic acid, formic acid, oxalic acid, glycollic acid, benzoic acid, oleic acid; 2,3,6-trichloro-benzoic acid, dodecyl benezene sulfonic acid, salicylic acid, nicotinic acid and $CH_3-CCl_2-COOH$.

2. The method for selectively combating weeds in cultures of root crops which comprises applying to the area where the weed combating effect the compound of the formula

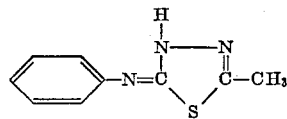

in an amount of 15 to 25 kgs./hectare.

3. A method for the pre-emergence control of undesirable plant growth which comprises applying to the soil containing seed of said undesirable plant growth, as a pre-emergence herbicide and in herbicidally effective amounts, a compound of the formula:

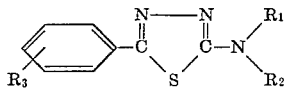

wherein $R_1$ is lower alkyl, $R_2$ is selected from the group consisting of hydrogen and lower alkyl, and $R_3$ is selected from the group consisting of hydrogen, nitro, alkoxy and halogen.

References Cited

UNITED STATES PATENTS

| | | | |
|---|---|---|---|
| 3,260,588 | 7/1966 | Schroeder. | |
| 3,282,950 | 11/1966 | Ottmann et al. | |
| 2,959,475 | 11/1960 | Luckenbaugh | 71—2.5 |
| 3,097,944 | 7/1963 | Riddell et al. | 71—2.5 |
| 2,799,683 | 7/1957 | Song | 260—306.8 |
| 2,966,495 | 12/1960 | Song et al. | 260—306.8 |

OTHER REFERENCES

Young et al., Chem. Soc., 79 (1901), pages 54 to 60.
Hoggarth, J. Chem. Soc., 1949, pages 1163 to 1167.

JAMES O. THOMAS, JR., *Primary Examiner.*

U.S. Cl. X.R.

260—306.8; 71—3; 424—270, 232, 266